Feb. 3, 1959     H. R. HUDSON ET AL     2,872,641
DIGITAL METER

Filed Sept. 15, 1954     2 Sheets-Sheet 1

INVENTORS
HAROLD R. HUDSON
WILLIAM Q. NICHOLSON
MERTON CARR WILSON
BY H. W. Brelsford
ATTORNEY

United States Patent Office 2,872,641
Patented Feb. 3, 1959

2,872,641

DIGITAL METER

Harold R. Hudson, Upland, and William Q. Nicholson and Merton Carr Wilson, Pasadena, Calif., assignors to Hycon Mfg. Company, Pasadena, Calif., a corporation of Delaware Application September 15, 1954, Serial No. 456,121

4 Claims. (Cl. 324—62)

Our invention relates to electrical meters for measuring amperes, volts, resistance, etc. and has particular reference to a digital or numerical reading meter as contrasted to a scale type meter which indicates a position on a graduated scale.

It is well known that errors are frequently made in reading scale type meters, not only because of the difficulty of locating the point indicated, but in also selecting the proper scale. This is especially troublesome in multiple scale meters and in all types of multimeters. Such errors are made in correlating the switching mechanism to the particular scale on the dial.

Our invention avoids these errors by providing numbers to be read. There is no possibility of error inasmuch as the exact numerical value is all that appears. Further, we have discovered that errors in correlating range of numbers to switching mechanism may be eliminated by making the scales decimal multiples and indicating the proper scale by means of indicating the decimal point. We provide connections between the range switching mechanism and the decimal point indicators so that this correlation is automatic and continuous.

While others have devised digital electrical meters, these have had numerous drawbacks. Some have been cumbersome and unreliable in operation and others have been too expensive for commercial use. The present invention provides a digital reading meter that is simple and reliable in construction, extremely accurate, and relatively inexpensive. Furthermore, it is fast in operation.

It is a general object of our invention to provide an improved digital reading electrical meter.

Another object is to provide a digital reading electrical meter that automatically correlates the total values read with the range switching mechanism.

A further object is to provide a digital reading electrical meter that compares an unknown electrical quantity against a reference electrical voltage.

Other objects and advantages of our invention will be apparent in the following description and claims considered together with the accompanying drawings in which:

Fig. 2 is a related series of voltage diagrams of which Fig. 2A is a line voltage diagram and Figs. 2B, 2C, and 2D are diagrams of different voltage wave forms synchronized with the line voltage for different operating conditions.

Figure 1:
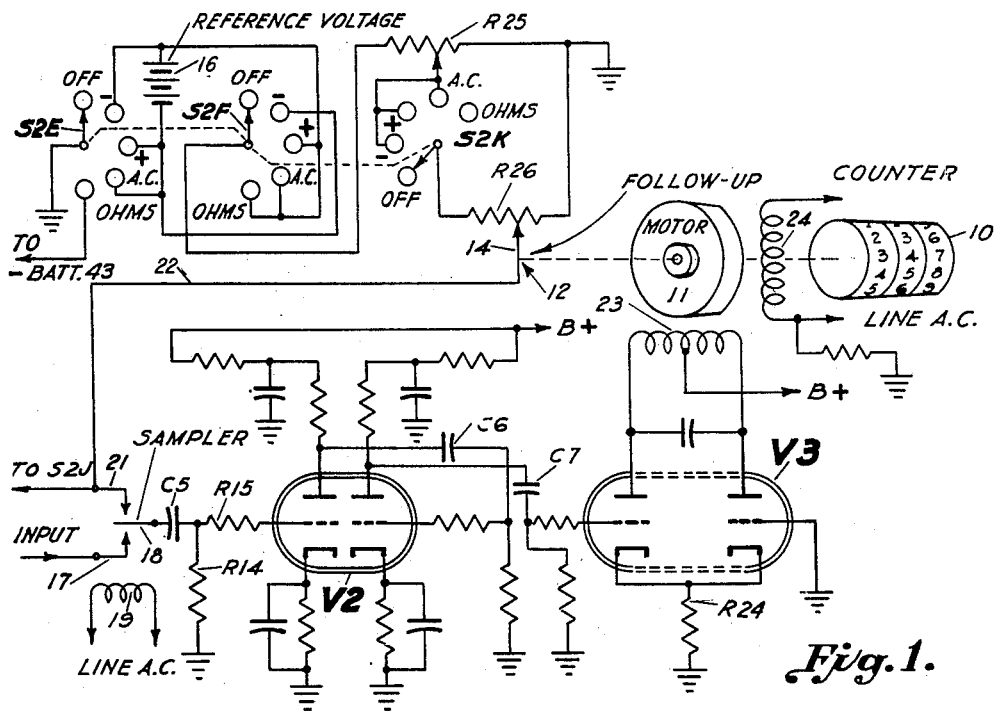
Fig. 1 is a schematic diagram of the electric circuit which receives an unknown input voltage and which converts it to a digital quantitative indication.

Referring to Fig. 1 there is illustrated a rotation counter 10 mechanically driven by a motor 11 which in turn drives a follow-up mechanism 12 in the form of a potentiometer resistor R26 contacted by a wiper 14. The motor 11 may be a two phase servo motor and quick starting and stopping is desired. The resistor R26 has current passing therethrough from a standard reference voltage obtained from a suitable source such as a mercury battery 16 which maintains its voltage practically constant over long periods of time. A pair of ganged switches S2–E and S2–F connect this battery to resistor R26 and are operable to reverse the polarity of the voltage from the battery. An accurately adjustable potentiometer R25 divides the voltage drop of the battery to ground, supplying the divided voltage to the potentiometer resistor R26 through a switch S2–K. R25 therefore acts as a calibration potentiometer. The voltage drop in resistor R26 establishes a range of voltage against which an unknown voltage may be compared.

Figure 3:
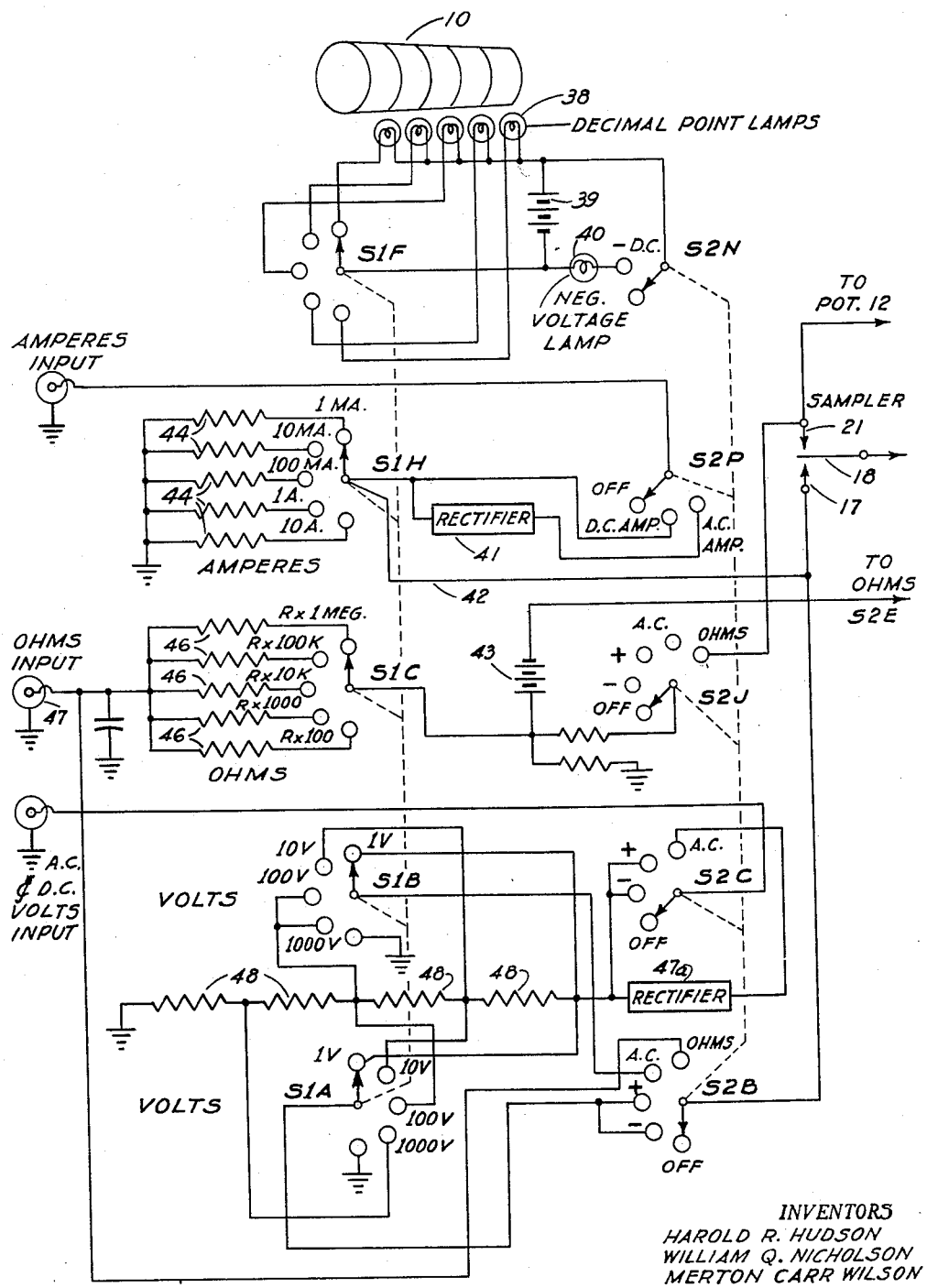
Fig. 3 is a schematic diagram of the range switches and selector switches which work in combination with the circuit of Fig. 1.

The unknown electrical quantity is converted into a voltage in the range of potentiometer R26 by the various scaling devices shown in Fig. 3. This unknown voltage is applied at terminal 17 of a vibrating sampler 18 driven at line frequency as symbolized by the winding 19. This sampler is also known as a chopper or contact modulator. Another terminal 21 of this sampler is connected by the conductor 22 to the reference voltage on wiper 14.

The sampler 18 may deliver the sampled voltage to the grid of a double amplifier V2 through a resistance capacitor coupling R14 and C5. A suitable plate resistance gives rise to a voltage which may be reflected through a capacitor C6 on to the grid of the other half of V2 and this output in turn may give rise to a voltage which is reflected through a capacitor C7 to a power tube or electron valve V3. The valve elements of V2 may have suitable resistors and capacitors connected to the cathodes and plates to filter out line voltage harmonics and convert the square wave input from the sampler into approximately a sine wave.

The sine wave output of V2 will be amplified in V3 which is preferably a double tube having cathode coupling by means of a common cathode resistor R24. The tube V3 will pass sufficient current to a signal winding 23 of the motor 11 to actuate the motor and the phase of this current determines the direction of rotation. This control of rotation direction is accomplished by the phase relationship of the alternating current in this directional winding 23 compared to the alternating current in a reference winding 24 which is connected to the usual line supply. This line supply may be the usual 60 cycle A. C. or may be any special A. C. that is available such as the 400 cycle A. C. currently used on airplane electrical systems.

Figure 2A:
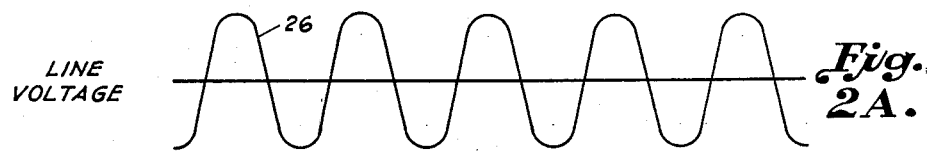
Figure 2:
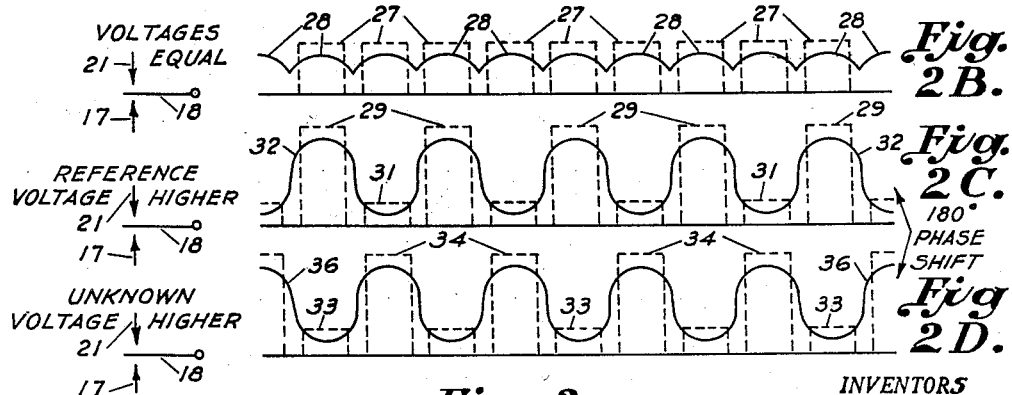

A simplified diagram of the phase relations of the voltages derived from the sampler 18 is illustrated in Fig. 2. Fig. 2A shows the line A. C. designated as 26 which is used as the reference in motor winding 24 and which is also used to operate the sampler 18. The sampler 18 accordingly operates approximately in phase with the line voltage, sampling the voltage at the terminal 21 on one half of the sine wave and sampling the voltage of the terminal 17 on the other half. If the voltages of the terminals 21 and 17 are equal, then square waves 27 will be formed as voltage samples, and after passing through the filter networks will have a rounded wave form 28. This wave form will be of no effect when presented at the motor direction sensing winding 23, and direction of rotation will not be determined and the motor will not rotate.

If, however, the reference voltage at terminal 21 is higher than the unknown voltage at terminal 17, then the sampler will receive alternate high and low square waves 29 and 31. When smoothed out in the filter system in the plate circuit of V3, these alternate high and low voltage pulses will be in the form roughly of a sine wave 32 as illustrated in Fig. 2C. It should be noted that this sine wave is in phase with the line A. C. of Fig. 2A for control winding purposes; that is, it has its peaks and valleys synchronized in point of time with the line A. C. The motor accordingly rotates in a forward direction.

If now the unknown voltage is higher than the reference voltage from cell 16, then the square wave of voltage from the unknown will be higher than the reference square wave. This is illustrated in Fig. 2D as alternate low and high square waves 33 and 34. These in turn will be modified by the filters to a sine wave 36. But sine wave 36 will have its peaks at a time that corresponds with the valleys of the line A. C. 26. It accordingly is 180° out of phase with this line A. C. The motor accordingly will rotate in a backward direction.

If, however, the unknown voltage is opposite in polarity from the reference voltage or exceeds the range of the reference voltage, then the motor keeps operating continuously until it exceeds the maximum reading and a suitable mechanical stop causes it to cease rotation.

The existence of various phase lags will be apparent to those skilled in the art and hence the illustrations of Fig. 2 are qualitative and not quantitative. They are, however, accurately illustrative of the mode of operation. These lags occur in the sampler 18, the motor winding 23 and elsewhere.

The rotations of the motor 11 are instantly and continuously totaled on the counter 10. At the same time the motor drives the potentiometer 12 through a gear reduction or screw thread or any other suitable mechanism. The motor continues to rotate until the voltage obtained by the potentiometer wiper 14 is equal to the unknown voltage. The electrical voltages then acting on the motor are then represented by Fig. 2B and the motor stops. If, due to mechanical inertia or fluctions in the unknown voltage, the motor over runs, then the phase will be reversed as between Fig. 2C and Fig. 2D and the motor will reverse until this condition of equilibrium is achieved. In every event, the total number of turns of the motor is represented by the numerical count on the counter 10 and is therefore a direct measure of the unknown voltage.

There is an accurate response of the electronic circuit and sensitivity accordingly is determined by the potentiometer 12. By making the resistor R26 of the potentiometer of wire windings and providing several thousand windings per volt of range together with a one turn sensitivity for the wiper 14, sensitivity on the order of one-half millivolt and accuracy of 1% is obtained.

Referring to Fig. 3 there is illustrated the switching circuits for automatically indicating the range of measurement by lighting decimal point lamps. Also there is illustrated the switching arrangement for selecting the proper type of measurement, that is, volts, amperes or ohms as well as A. C. and D. C. In the upper part of Fig. 3 the counter 10 is provided with decimal point lights 38 energized by a current source indicated by a battery 39, but which could be A. C. also from the power supply (not shown) or elsewhere. The proper lamp 38 is selected by a switch S1-F which is mechanically connected to switches S1-H, S1-C, S1-B, and S1-A which select proper range resistors for the amperes, ohms and volts respectively. The lamps 38 are placed between the different rotatable sections of the counter 10 and hence are in the proper position to indicate decimals for the counter readings.

The resistors connected to switches S1-H, S1-C and S1-B are provided in accordance with the invention. The resistors are graduated in resistance so that the output from one resistor selection will differ by a factor of 10 from the output at the next resistor selection by these switches. This difference by a factor of 10 makes possible the correlation of the resistor selection with the decimal point lights 38 since each decimal point varies from the next by a factor of 10. This correlation of decimal point lights and resistor values is also in accordance with the invention. The indicated values for amperes, ohms and volts at switches S1-H, S1-C, and S1-B are suggestive only and any selected group of scales may be used. The particular values for the resistors are readily determined by those skilled in the art depending upon the results desired.

The switches which select the type of unknown to be measured are S2-P, S2-J, S2-C, and S2-B. These are mechanically interconnected and also are mechanically connected to a switch S2-N which energizes a warning lamp 40 which indicates the fact that a negative D. C. voltage is being measured. These switches are also mechanically connected to switches S2-E and S2-F of Fig. 1.

The input for the ampere reading (preferably from a probe) is fed into the wiper of switch S2-P which may connect it to A. C. or D. C. contacts on the switch. The A. C. contact is connected to a rectifier 41 which converts the A. C. into D. C. of a proper value from whence it travels with regular D. C. to the wiper of switch S1-H. This switch in turn selects the proper resistor of a bank of resistors 44 which act to connect the unknown current to ground. The voltage developed by the current flow in the appropriate resistor is conducted to the sampler 18 by a conductor 42 and measured in the manner previously described.

The measurement of ohms is accomplished by passing a current from a battery 43 through the unknown resistor, which is connected to ground, and measuring the resultant voltage. The switches S2-J and S2-B connect a bank of resistors 46 into the circuit of sampler 18 and the scaling resistors are connected in parallel to a contact 47 to which one end of the unknown resistance is connected. This contact 47 is preferably a probe. Current from the battery 43 flows through a selected resistor 46 and the voltage drop is measured by the circuit of Fig. 1 as previously explained. The resistors 46 are of different ohms to properly select a range for the unknown resistance. When the various switches are operated, including S2-F and S2-K to set the meter for reading ohms, reference cell 16 is cut out of the circuit and battery 43 (Fig. 3) is substituted instead, and its voltage appears at sampler terminal 21. This voltage is varied by the potentiometer 14 as the servo motor 11 rotates to balance the voltage with the unknown developed voltage from S2-B appearing at sampler terminal 17.

The measurement of voltage is accomplished by connecting the unknown voltage to the wiper of S2-C and there are three contacts to which this may be connected, the negative contact, the positive D. C., and the A. C. The A. C. contact is connected to a rectifier 47a which converts it to D. C. of an appropriate value, and all three voltages are connected to one end of a group of series connected resistors 48. Switches S1-A and S1-B add together the necessary number of resistors 48 to select an appropriate range of measurement as indicated by the decimal point lamps 38. The connection of a negative voltage for measurement not only energizes the warning lamp 40, but reverses the polarity of the reference cell 16 of Fig. 1 by means of switch S2-F.

While we have described our invention with respect to specific embodiments thereof, it will be appreciated by those skilled in the art that various modifications could be made therein. We therefore include all such modifications as fall within the true spirit and scope of our invention.

We claim:

1. A digital reading voltmeter comprising: an alternating sampler, a source of standard D. C. reference voltage; means for connecting an unknown voltage to said sampler; a source of alternating line current; said sampler alternately contacting the reference voltage directly and the unknown voltage directly so that each is sampled at line frequency; an electric motor having a control winding that determines the direction of rotation of the motor and having also a line frequency winding; means for passing an alternating current through the directional control winding having a phase dependent upon the sense of unbalance and magnitude corresponding to the sum of the sampled voltages; a follow-up mechanism driven by the motor for changing the reference voltage at a regular rate depending upon motor rotation; digital means for indicating the total rotations of the motor; an indicating lamp; and a switch for reversing the potential of the standard reference voltage and simultaneously energizing the lamp, whereby negative D. C. voltages may be measured by the voltmeter and the fact of negative measurement will be visually indicated by the energized lamp.

2. An electric meter, comprising a bridge circuit including a first resistor connected in a first arm, a second resistor connected in a second arm, a third resistor connected in a third arm, and a fourth variable resistor connected in a fourth arm, said arms connected in series order to form said bridge, means for connecting an unknown resistance in parallel with said first resistor, a source of voltage connecting the common junctions of said second and third arms and said first and fourth arms, a vibratory sampler having a pair of input terminals connected to the common junctions of said first and second arms and said third and fourth arms, unbalance detecting means connected to said vibratory sampler output, a servo motor connected to and controlled by said unbalance detecting means, digital indicating means coupled to said motor, and a driving coupling between said motor and said fourth variable resistor, said servo motor being adapted to drive said indicating means and said variable resistor to reduce an unbalanced sampler output, whereby a reading is provided when said variable resistor is adjusted to balance said bridge according to the value of said unknown resistance.

3. The device of claim 2, in which said indicating means includes a digital decimal counter.

4. The device of claim 2, including, in addition, range selector means for selectively replacing said first and second resistors with different valued resistors.

References Cited in the file of this patent

UNITED STATES PATENTS

| | | |
|---|---|---|
| 2,470,644 | Redman | May 17, 1949 |
| 2,473,334 | Greenwood | June 14, 1949 |
| 2,478,966 | Gilbert | Aug. 16, 1949 |
| 2,632,886 | Barney | Mar. 24, 1953 |
| 2,643,344 | McLaren | June 23, 1953 |
| 2,668,264 | Williams | Feb. 2, 1954 |
| 2,697,191 | Wannamaker | Dec. 14, 1954 |
| 2,786,169 | Muffly | Mar. 19, 1957 |
| 2,806,207 | Edwards | Sept. 10, 1957 |